July 5, 1960
O. L. NORDIN
2,943,869
COUPLINGS AND SAFETY DEVICES THEREFOR
Original Filed Feb. 25, 1959
5 Sheets-Sheet 1
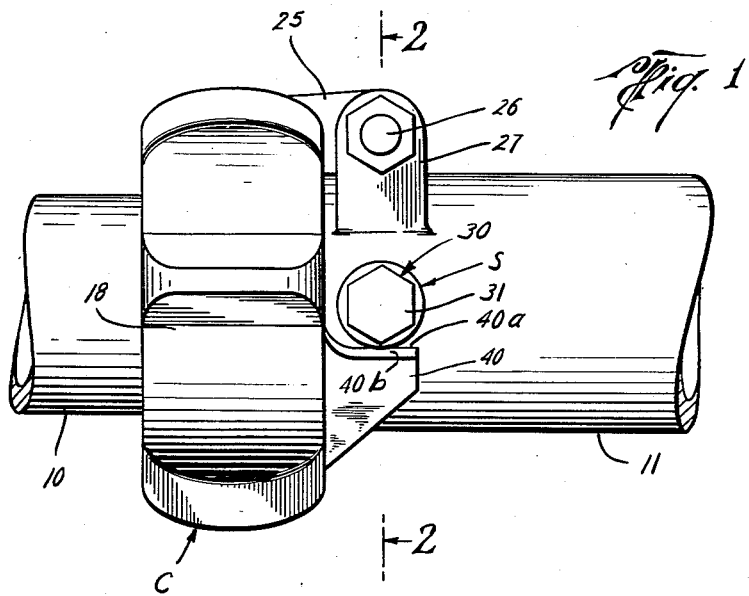
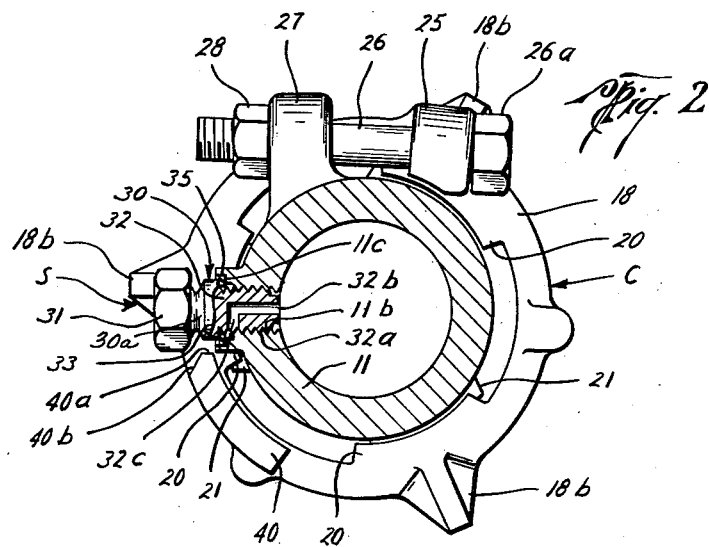
Obert L. Nordin
INVENTOR.
BY J. Vincent Martin
Joe E. Edwards
B. R. Pravel
ATTORNEYS July 5, 1960     O. L. NORDIN     2,943,869
COUPLINGS AND SAFETY DEVICES THEREFOR
Original Filed Feb. 25, 1959     5 Sheets-Sheet 2
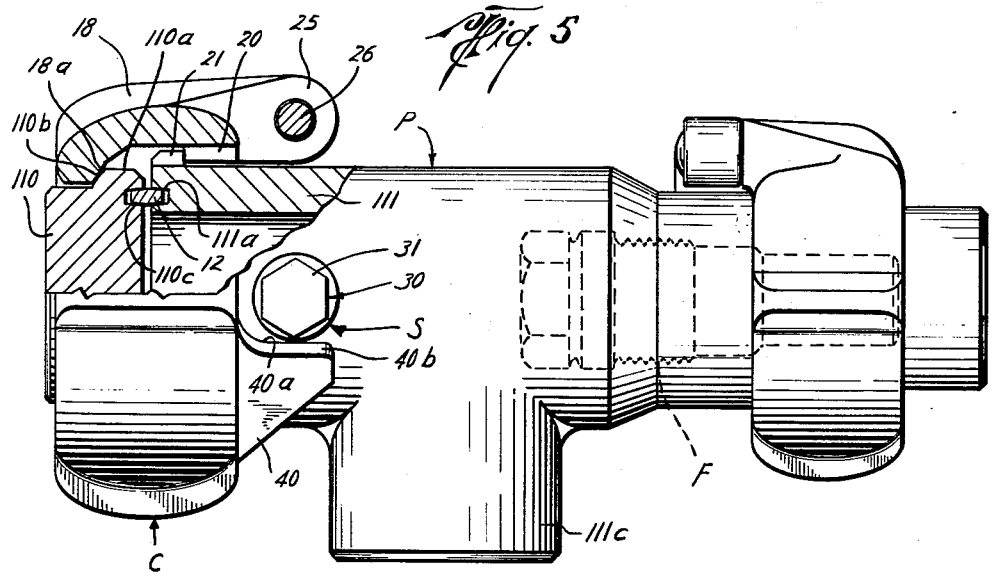
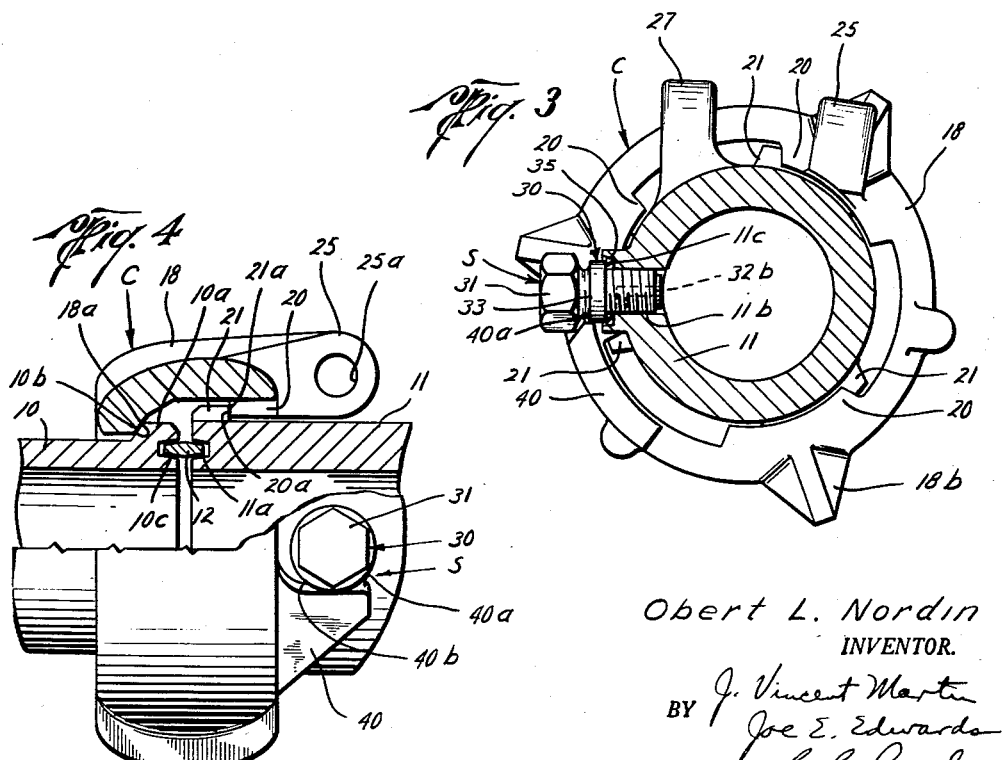
Obert L. Nordin
INVENTOR.
BY J. Vincent Martin
Joe E. Edwards
B. R. Pravel
ATTORNEYS July 5, 1960

O. L. NORDIN 2,943,869

COUPLINGS AND SAFETY DEVICES THEREFOR

Original Filed Feb. 25, 1959

Obert L. Nordin
INVENTOR.

BY J. Vincent Martin
Joe E. Edwards
B. R. Pravel
ATTORNEYS

July 5, 1960     O. L. NORDIN     2,943,869
COUPLINGS AND SAFETY DEVICES THEREFOR
Original Filed Feb. 25, 1959     5 Sheets-Sheet 4
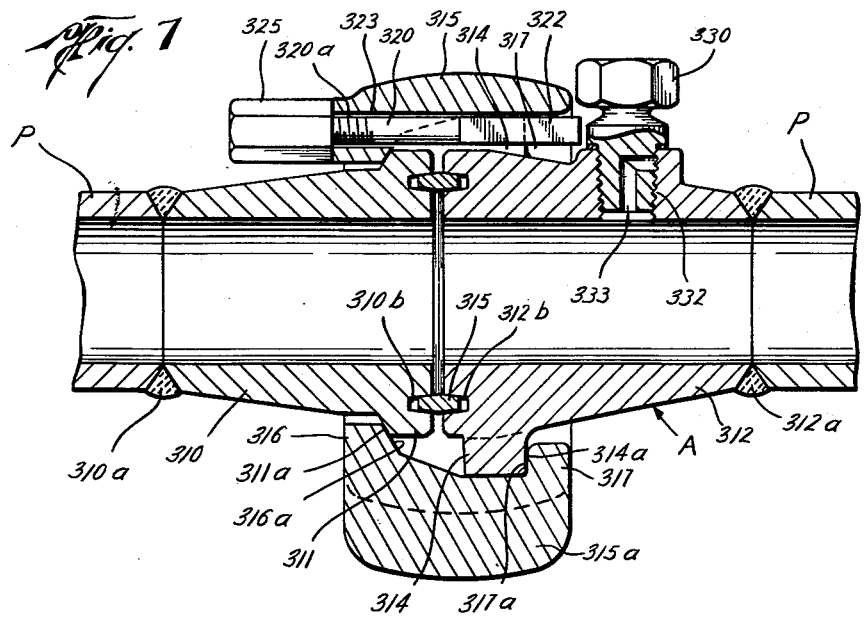
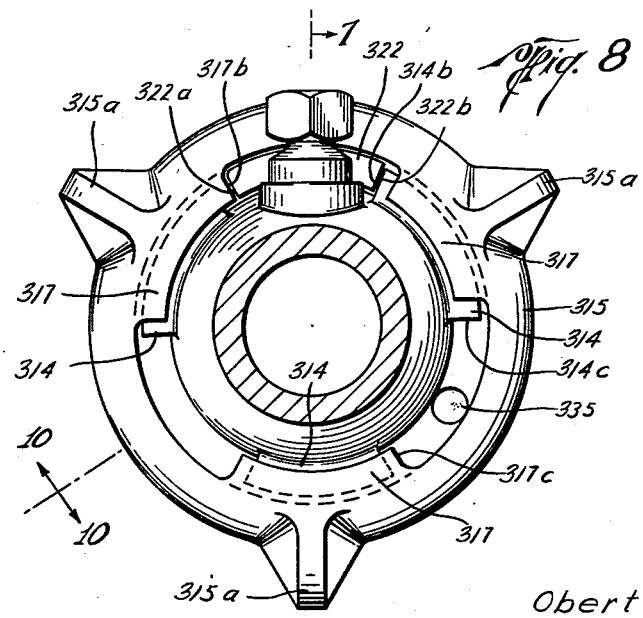
Obert L. Nordin
INVENTOR.
BY J. Vincent Martin
Joe E. Edwards
B. R. Ravel
ATTORNEYS July 5, 1960            O. L. NORDIN            2,943,869
COUPLINGS AND SAFETY DEVICES THEREFOR
Original Filed Feb. 25, 1959            5 Sheets-Sheet 5
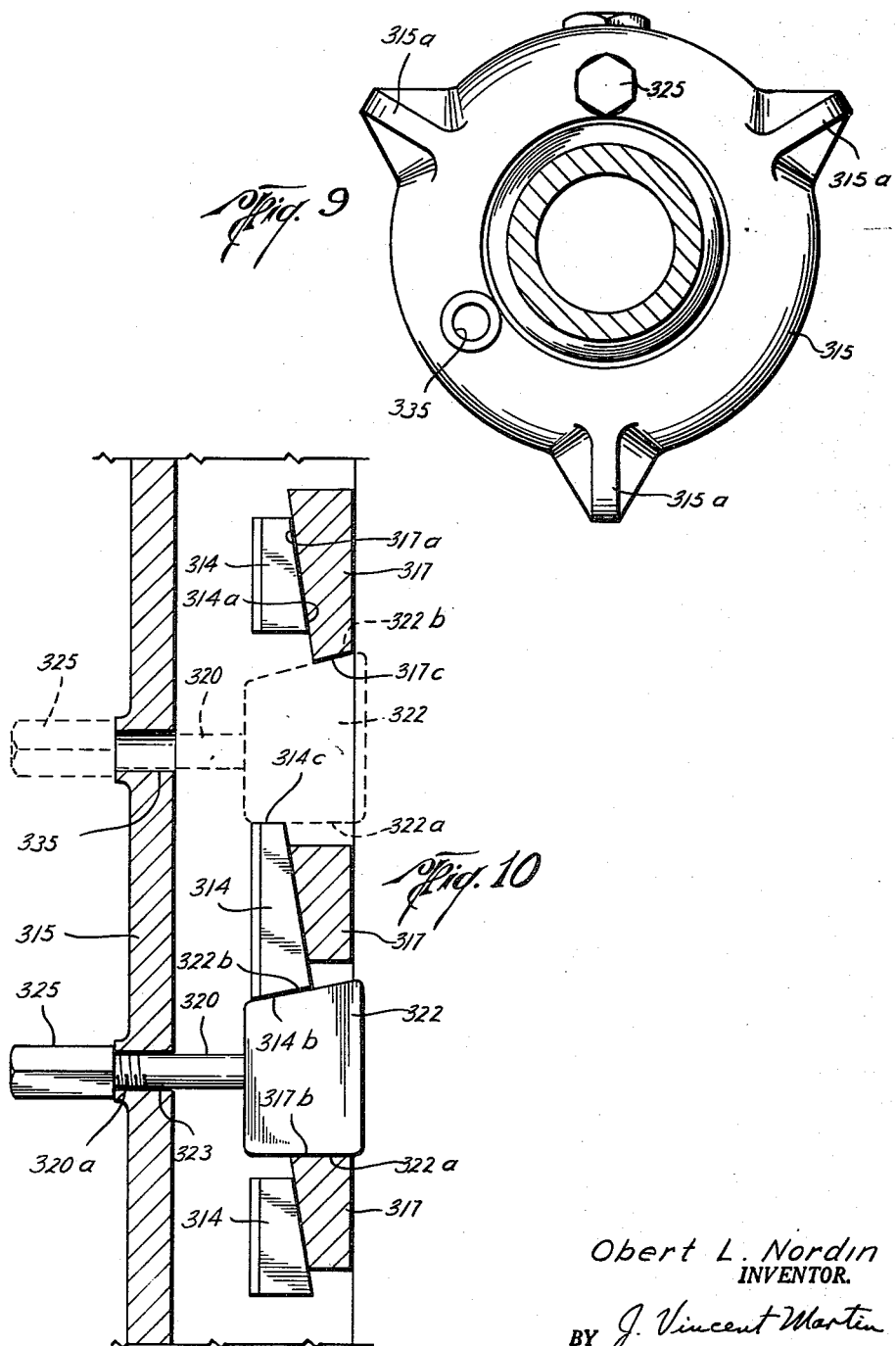
Obert L. Nordin
INVENTOR.
BY J. Vincent Martin
Joe E. Edwards
B. R. Pravel
ATTORNEYS

# United States Patent Office 2,943,869
Patented July 5, 1960

2,943,869

COUPLINGS AND SAFETY DEVICES THEREFOR

Obert L. Nordin, P.O. Box 1184, Houston, Tex.

Continuation of application Ser. No. 797,819, Feb. 25, 1959. This application Aug. 7, 1959, Ser. No. 832,187

12 Claims. (Cl. 285—90)

This invention relates to new and useful improvements in couplings and safety devices therefor. This application is a continuation-in-part of my applications Serial No. 485,680, filed February 2, 1955, for Pipe Couplings; Serial No. 496,776, filed March 25, 1955, for Couplings and Safety Devices Therefor; and a continuation of Serial No. 797,819, filed February 25, 1959, for Couplings and Safety Devices Therefor.

An object of this invention is to provide a new and improved coupling or connecting device and a safety device therefor, wherein the safety device is adapted to prevent the disassembly or uncoupling of said coupling or connecting device prior to the equalization of the fluid pressure within the coupling with the pressure exteriorly thereof.

An important object of this invention is to provide a new and improved coupling or connecting device and a safety device therefor, including means for warning the operator that the fluid pressure within the coupling has not been equalized with the fluid pressure exteriorly thereof prior to the disassembly or uncoupling of said coupling or connecting device.

Another object of this invention is to provide a new and improved safety device which is adapted for use with couplings and the like having parts thereof which are releasably connected together, such safety device including a removable bleeder plug which prevents the disassembly or uncoupling of said couplings and the like prior to the removal of said plug therefrom.

Another object is to provide a lug type coupling in which the coupling cannot be disassembled prior to release of fluid pressure within the coupling thus preventing any possibility of high pressure fluids becoming effective upon a free part of the coupling.

Another object is to provide a coupling as in the preceding object in which a bleeder plug must be removed before the coupling can be disassembled and the plug has a weakened portion between the wrench part and threaded part to permit the plug to shear at the weakened portion when excessive torque is applied to the plug, thus protecting against the stripping of the plug threads which would free the plug while it is subject to high pressure fluid.

Another object is to provide a lug type coupling in which it is impossible for high pressure fluid to become effective upon a free part of the coupling.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is an elevation of the coupling or connecting device of this invention with the improved safety device therewith.

Figure 2 is a sectional view of the coupling of Figure 1 taken on line 2—2 of Figure 1.

Figure 3 is a sectional view similar to Figure 2, but illustrating the coupling or connecting device after disassembly thereof has been attempted but prior to the removal of the safety device from the coupling or connecting device.

Figure 4 is a view, partly in elevation and partly in section, illustrating the coupling or connecting device of Figure 1 after it has been moved to the position of Figure 3.

Figure 5 is a view, partly in elevation and partly in section, illustrating the safety device of this invention in use with a coupling or connecting device which is mounted on a positive choke.

Figure 7 is a sectional view illustrating the coupling of this invention in assembled position.

Figure 8 is an end view of the coupling illustrated in Figure 7.

Figure 9 is also an end view of the coupling illustrated in Figure 7, but viewing Figure 7 from the opposite end as compared to Figure 8.

Figure 10 is a development of the coupling illustrated in Figure 8, the intersection for such development being located at line 10—10 of Figure 8.

Figure 6:
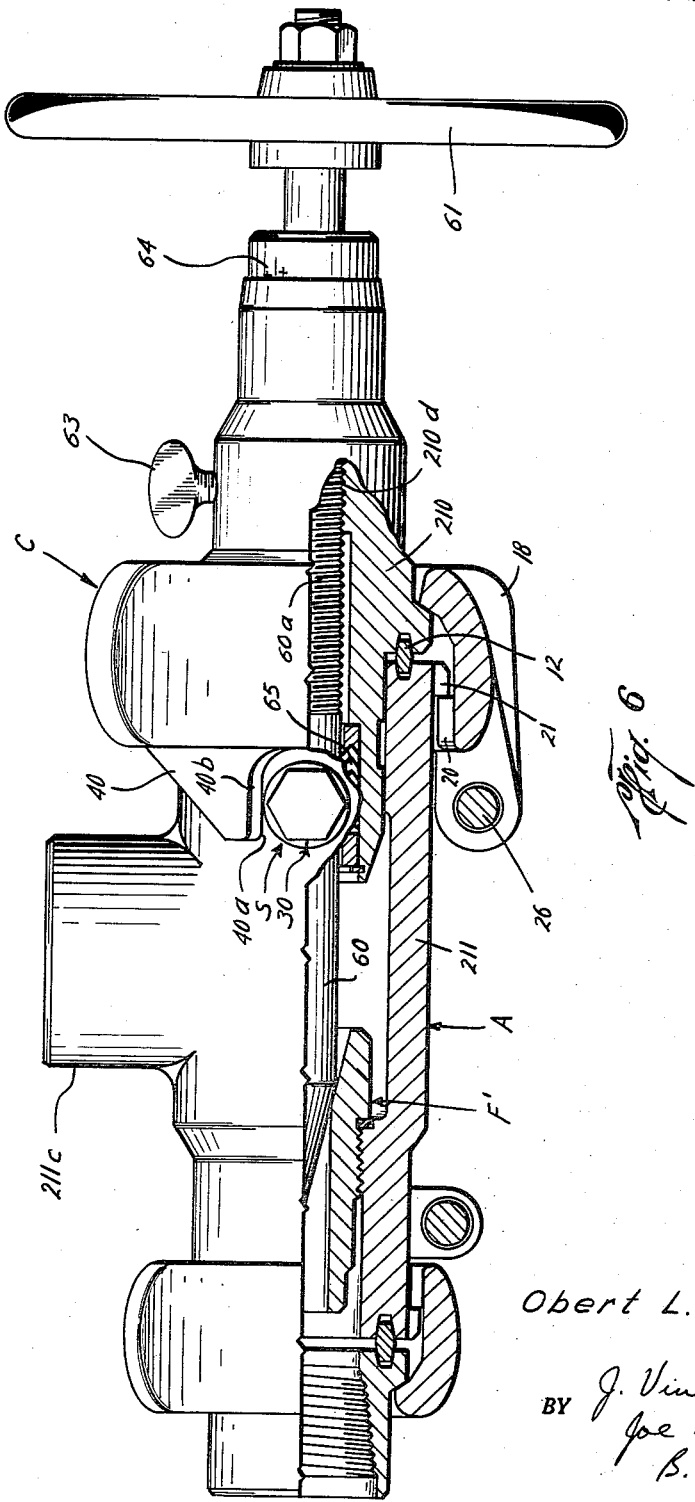
Figure 6 is a view, partly in elevation and partly in section, illustrating the safety device of this invention in use with a coupling or connecting device mounted on an adjustable choke.

In the drawings, the letter C designates the coupling or connecting device of this invention which, as will be explained, is generally referred to herein simply as a coupling C. The coupling C of this invention includes any coupling or connecting member which is adapted to releasably connect together adjacent body sections such as sections of pipe. The safety device S of this invention is adapted for use with a coupling C so that such coupling C cannot be disassembled or uncoupled prior to the equalization of the pressure within the coupling with the pressure externally of the coupling, as will be more evident hereinafter.

Considering first the form of the invention illustrated in Figures 1-4, the coupling C releasably connects together body sections 10 and 11, each of which is attached to or is integral with a pipe or some other piece of equipment (not shown). In the form of the invention of Figures 1-4, the body section 10 takes the form of a plain hub which is substantially cylindrical and which has an annular radially extending flange 10a which has a seating shoulder 10b formed thereon. An annular groove 10c is provided in the inner end of the plain hub 10 for receiving a part of a seal ring 12 which is formed of metal or any other suitable material for forming a fluid-tight seal with the plain hub 10. The other body section 11 takes the form of a lug hub in Figures 1-4 and it has an annular recess 11a at its inner end in which the seal ring 12 is also adapted to extend so that when the sections 10 and 11 are moved together, the seal ring 12 is in sealing engagement with the walls or surfaces of the grooves 10c and 11a, whereby fluid is prevented from passing between the ends of the sections 10 and 11.

An annular nut 18 surrounds the body sections 10 and 11. Near one end of the annular nut 18, an annular inwardly extending shoulder 18a is constructed for contact with the outwardly extending shoulder 10b of the plain hub or body section 10, with the surfaces 18a and 10b having the same inclination. The annular nut member 18 has a plurality of lugs 20 formed at the end thereof opposite from said annular surface 18a which are adapted to co-act with lugs 21 on the lug hub or body section 11.

The lugs 20 and 21 are formed in segments (Figures 2 and 3) and have their adjacent surfaces 20a and 21a inclined or wedge-shaped so that upon a rotation or turning of the nut member 18 relative to the lug hub 11, the lug hub 11 is moved longitudinally or axially toward the plain hub or body section 10. Such hub construction is well known and is of the type illustrated in United States Patent No. 2,025,112, and although the invention hereof is not limited to the use of a coupling C having the wedge-type lugs 20 and 21, such coupling is preferably used.

The nut member 18 has a longitudinally extending arm 25 formed therewith for receiving a bolt 26 through the opening 25a in the arm 25 (Figure 4). The body section or lug hub 11 also has a bolt receiving arm 27 formed therewith or suitably secured thereto and such arm 27 has an opening (not shown) through which the bolt 26 is adapted to extend when it is also extending through the opening 25a of the arm 25. A nut 28 is threaded on the end of the bolt 26 opposite from the bolt head 26a so that the annular nut 18 and the lug hub 11 are moved toward each other as the arms 25 and 27 are moved toward each other during the tightening of the nut on the bolt 26. Ordinarily, the nut 18 is tightened on the body sections 10 and 11 by turning the nut member 18 relative thereto by striking one or more of the hammer projections 18b with a hammer or other similar means so as to move the arm 27 into alignment with the arm 25 for readily positioning the bolt 26 through the respective openings in the arms 25 and 27. Thus, in the usual case the bolt 26 with the nut 28 therewith serve to merely hold the arms 25 and 27 against movement away from each other thereby serving to prevent a movement of the nut 18 relative to the section 11. So long as such condition exists, the seal ring 12 is maintained under adequate compression to prevent a fluid leakage around same.

Since the pressure within the coupling C, that is, within the bores of the body sections 10 and 11, is often extremely high, it is dangerous to disconnect or disassemble the parts of the coupling without first bleeding or releasing the pressure within the coupling C so as to equalize same with the pressure of the atmosphere or the fluid externally of the coupling C. The safety device S of this invention prevents the disassembly or uncoupling of the annular nut 18 from the body sections 10 and 11 prior to the release of the pressure of the fluid within the coupling C so as to equalize same with the fluid pressure exteriorly of the coupling C. For accomplishing such safety feature, the safety device S includes a plug 30 which has a head 31 with its sides formed to receive a wrench. The head 31 is connected to the threaded portion of the plug 30 by means of an intermediate shank 33 which is of a slightly increased diameter as compared to the maximum diameter of the threaded portion 32 of the plug 30. The body section 11 has an opening 11b therethrough which is internally threaded for receiving corresponding external threads 32a on the threaded portion 32 of the plug 30. The threaded portion 32 of the plug 30 has a longitudinal passage or opening 32b which communicates with the interior of the body section 11 and also communicates with the passage 32c which extends laterally therefrom. Such lateral passage or opening 32c is formed below the shank 33 and in order to prevent leakage from the interior of the body section 11 outwardly through the openings 32b and 32c when the coupling C is in its assembled position (Figures 1 and 2), a resilient ring 35 formed of rubber or other elastic resilient material is seated on an annular gasket seat 11c and it extends radially inwardly so that the shank 33 is adapted to place the seal ring 35 under compression when the plug 30 is fully seated. Thus, with the plug 30 in its fully seated position, the seal ring 35 prevents the escape of fluid from the interior of the coupling C.

A stop member 40 is formed integrally with, or is otherwise attached to, the nut 18. The stop member 40 extends longitudinally from the nut 18 and is so positioned with respect to the arm 25 that it is adapted to contact the plug 30 upon rotation of the nut 18 from its locked or wedged position (Figures 1 and 2). Ordinarily, with the bolt 26 in place in the arms 25 and 27, the lateral surface 40a is spaced from the shank 33 of the plug 30. The inclined surface 40b is inclined sufficiently so that when the lateral surface 40a moves into contact with the shank 33, the surface 40b is still spaced from the head 31 of the plug 30, whereby substantially no bending moment is applied to the plug 30 if the nut member 18 is attempted to be rotated or turned while the plug 30 is in its seated position. As will be explained hereinafter, the space between the lateral surface 40a and the shank 33 is such that upon the removal of the bolt 26 from the arms 25 and 27, the nut member 18 can be moved a sufficient distance to unseat the seal ring 12 (Figure 4) sufficiently to permit the fluid under pressure within the body sections 10 and 11 to flow around the seal ring 12 and outwardly between the spaces adjacent the lugs 20 and 21. Thus, the space between the lateral surface 40a and the shank 33 is sufficient to permit the turning of the nut member 18 a distance to permit leakage of the fluid under pressure around the seal ring 12. Since the lateral surface 40a is at that time in contact with the shank 33 of the plug 30, the nut member 18 does not permit the disassembly or uncoupling of the parts of the coupling C but the fluid under pressure is permitted to slowly escape around the seal ring 12 which results in a hissing, and in some cases a screeching, sound which serves to warn the operator that the plug 30 has not been removed. Such warning occurs prior to the time that the coupling C has been disassembled or uncoupled so that no danger exists at that time to the operator. Of course, if the plug 30 has been removed prior to the release of the bolt 26 from the arms 25 and 27, then the pressure from the coupling C, and more particularly from within the bore of the body section 11, has already been bled or released gradually through the openings 32b and 32c, so that the necessity for the leakage around the seal ring 12 to give the warning signal has been eliminated.

From the above it will be appreciated that the coupling cannot be disassembled without removing plug 30. However, the plug itself presents a possible danger point as a workman may tighten the plug while the coupling is under pressure. If sufficient torque is applied threads 32a may strip and the plug would suddenly be freed while subject to coupling pressure. These couplings will be subjected to pressures up to and greater than 15,000 p.s.i. and a free plug would be extremely dangerous. This contingency can be guarded against by employing a plug whose threads cannot be stripped. The plug threads may be protected in any desired manner which will limit the torque which can be applied to the threads. Preferably this is accomplished by weakening the plug intermediate the threaded portion 32a and the wrench part 31. Such weakening may be accomplished by reducing the cross section of the plug at this point as by the groove 30a. The depth of the groove 30a should be such that when excessive torque is applied to wrench part 31 the plug will shear at groove 30a before threads 32a are damaged. Thus there is provided a completely safe lug type coupling in which no part of the coupling can be freed while subject to elevated pressures within the coupling.

The operation or use of the coupling and safety device of this invention, as illustrated in Figures 1–4, is believed evident from the foregoing description. Basically, such operation or use includes the initial assembly of the nut member 18 on the body sections 10 and 11. That is preferably accomplished by sliding the nut member 18 longitudinally from the body section or plain hub 10 longitudinally so as to move the lugs 20 through the spaces between the lugs 21. Such longitudinal movement of the nut 18 is continued until the annular surface 18a is substantially in complete contact with the annular surface 10b of the plain hub 10. At that time, the nut member 18 is rotated or turned so as to cause the adjacent faces 20a and 21a of the lugs 20 and 21, respectively, to slide relative to each other. Since such surfaces 20a and 21a are inclined or wedge-shaped, the relative movement of the nut member 18 and the lug hub 11 effects a longitudinal movement of the nut 18 and the hub 11 toward each other so as to move the sections 10 and 11 toward each other to compress the seal ring 12 in fluid-tight sealing engagement in the respective grooves 10c and 11a. The turning of the nut 18 relative to the lug hub 11 is continued until the arms 25 and 27 have their respective openings aligned so that the bolt 26 can be positioned therethrough. Such turning of the nut member 18 can be done by hand, but generally the hammer projections 18b are contacted with a hammer to effect the final tightening. With the bolt 26 in position in the arms 25 and 27, the nut 28 is tightened. Then, the plug 30 is threaded into the threaded opening 11b so as to form a fluid-tight seal with the seal ring 35 to prevent any possibility of fluid escaping through the passages 32b and 32c of the threaded portion 32 of the plug 30. When the plug 30 is thus positioned, the lateral surface 40a of the stop member 40 is spaced from the shank 33 of the plug 30 as indicated in Figure 2.

When it is desired to disconnect or disassemble the coupling C, the operator should first remove the bleeder plug 30 by unthreading same from the threaded opening 11b in the body section 11. As the plug 30 is thus rotated, by means of a wrench which is applied to the wrench head 31, the lateral passage 32c is initially exposed so that fluid under pressure is allowed to bleed or escape slowly through the passages 32b and 32c from the interior of the body section 11. In that manner, the pressure within the body section 11 is gradually equalized with the atmospheric pressure or other fluid pressure externally of the coupling C. Of course, when the plug 30 has been completely removed, the fluid under pressure gives a hissing sound to warn the operator, or if the master valve on the well is closed as is the usual case, then the pressure internally and exteriorly of the coupling C is equalized. With the plug 30 removed, the nut member 18 is free to move without any obstruction upon the removal of the bolt 26 from the arm 25 and 27.

From the above procedure, it will be evident that the disassembly of the coupling C is substantially the same as that performed with a normal coupling or connecting device, except that the safety plug 30 must be removed prior to the turning of the nut member 18. However, if the plug 30 is not removed, such plug 30 co-acts with the stop member 40 to prevent the release of the nut member 18 from the body sections 10 and 11, even though the bolt 26 has been removed.

Thus, assuming that the operator, in disassembling the coupling C, has forgotten to remove the plug 30 but he has removed the bolt 26 from the arms 25 and 27, when he applies a hammer or other means to the nut 18 for effecting a rotation thereof relative to the body section 11, the lug 40 will move with the nut member 18 so as to cause the surface 40a thereof to abut or contact the shank 33 of the plug 30. Such abutment results in the stopping of the turning or rotational movement of the nut member 18 relative to the body section 11.

Due to the fact that the lateral surface 40a is spaced from the shank 33 under normal conditions with the bolt 26 and the arms 25 and 27, a slight amount of turning of the nut member 18 relative to the body section 11 is permitted. Such slight amount of relative movement between the nut 18 and the body section 11 causes the parts to move to the position shown in Figures 3 and 4 and sufficiently releases the compression on the seal ring 12 to cause leakage around the seal ring 12 from the interior of the body sections 10 and 11. Such leakage of fluid under high pressure results in a hissing, and in some cases a screeching, sound which serves to warn the operator that he has failed to bleed or release the fluid pressure from within the coupling C or the parts connected thereto. The operator can then return the nut 18 to its locked position and with the bolt 26 reinserted, can then remove the safety bleed plug 30 in the normal manner to bleed off the pressure within the body section 11.

It is therefore believed evident that the safety device S which is used with the coupling C of Figures 1–4 not only prevents the release or disassembly of the coupling C prior to the equalization of the fluid pressure within the coupling C with that pressure exteriorly thereof, but also it provides a means for warning the operator when he has failed to effect such equalization prior to the disassembly of the coupling C. In some cases it may not be desirable to use the warning and in such cases the lateral surface 40a of the stop member 40 can be in abutment with or in substantial abutment with the shank 33 of the plug 30 when the coupling C is in its assembled position with the bolt 26 in place.

In Figure 5, the safety device S is shown in use with the coupling or connecting member C mounted on a positive choke used in oil well operations. The safety device S is identical with that illustrated in Figures 1–4 and functions in the same manner. The coupling or connecting member C is the same as that illustrated in Figures 1–4 and bears like numerals for like parts, with the exception of the body sections 110 and 111 which are somewhat modified in Figure 5 as compared with Figures 1–4. Thus, the body section 110 in Figure 5 takes the form of a closure cap or disk rather than a cylindrical pipe as indicated by the numeral 10 in Figures 1–4. The body section 111 is substantially the same as the body section 11 of Figures 1–4, except that it is a part of the choke body, such choke being identified by the letter P.

The choke P is of the positive type and has the body section 111 formed in a substantially T-shape with the flow bean F being of conventional construction. As is well known, positive type chokes such as indicated by the letter P in Figure 5 have a body portion 111c which is adapted to be welded or otherwise secured to a pipe leading from the oil well, whereby oil or other fluid under pressure is adapted to flow upwardly through the tubular portion 111c and then through the flow bean F. The fluid within the choke P is therefore ordinarily under considerable pressure. If it is necessary to replace the flow bean F, the closure 110 must be removed.

The removal of the closure 110 is effected in the same manner as explained above in connection with Figures 1–4. The safety plug 30 must be initially removed so that the pressure within the choke P is permitted to bleed or gradually escape so as to equalize such fluid pressure within the choke P with the atmospheric pressure or other pressure externally thereof. Thereafter, the bolt 26 is removed and the nut member 18 is rotated relative to the body section 111 to position the lugs 20 between the lugs 21 so that the nut member can then be moved axially or longitudinally (to the left in Figure 5) so as to slide the nut member 18 off the body section 111. It will be evident that as the nut member 18 is moved off the body 111, the closure 110 can then be released or removed from the body section 111 also.

In the event that the operator fails to remove the plug 30, the limited amount of turning of the nut member 18 is preferably provided as explained above in connection with Figures 1–4 so that the seal ring 12 is released from its full compression to permit a leakage of the fluid within the choke P around the seal ring 12 to effect a warning to the operator by the hissing noise from the escaping fluid under pressure. Thus, the operation of the device of Figure 5 is identical with that described above in connection with Figures 1–4.

In Figure 6, the safety device S is illustrated in use with a coupling or connecting member C which is mounted on an adjustable-type choke A. The safety device S is identical with that illustrated in Figures 1–4 and functions in the same manner. The coupling C is substantially identical with that illustrated in Figures 1–4 and like parts bear like numerals. The body section 210 and the body section 211 correspond with the body sections 10 and 11, respectively, of Figures 1-4, but in Figure 6 the body section 210 takes the form of a bonnet through which the adjustable choke needle 60 extends. The body section 211 takes the form of the housing or body of the adjustable choke A and has therewith a tubular portion 211c which is adapted to be connected with a pipe on an oil well or the like. Fluid under pressure is, therefore, ordinarily admitted into the interior of the adjustable choke A. When the needle 60 is moved axially or longitudinally to the right in Figure 6 from the flow bean F', the flow bean F' is open and permits the fluid to flow therethrough under controlled conditions, in the well known manner. Also, as is well known, the needle 60 can be adjusted longitudinally or axially relative to the flow bean F' by the rotation of the handle 61 which effects a turning of the needle 60 and by reason of the threads 60a engaging with the internal threads 210d in the body section 210, the needle 60 is moved longitudinally. A set screw 63 is provided for holding the needle 60 in a predetermined position as indicated on the scale 64. It will also be observed that the body section 210 carries packing 65 in the usual manner for sealing around the needle 60. Thus, it is believed evident that except for the particular coupling C and the safety device S therewith, the adjustable choke A is of a well known construction.

In the operation or use of the adjustable choke A, it often becomes necessary or desirable to replace the flow bean F', stem 60, or other internal parts of the choke A, and to effect such replacement the bonnet 210 with the stem 60 and related parts must be removed so as to obtain sufficient room to position a wrench or other tool within the body section 211 for unthreading the flow bean F' from its seated position. In releasing the coupling C so as to release the body section 210 from the body section 211, the same precaution must be observed as explained above in connection with Figures 1-5. In other words, the fluid pressure within the adjustable choke A must be released prior to the disassembly of the coupling C or otherwise such parts are subject to being hurled through the air by reason of the rapid release of pressure during the disassembly of the coupling. Such hurling or throwing of the parts of the coupling C by releasing same under high pressure without previously bleeding off such fluid pressure has been known to result in the death of the operators. Thus, as explained above in connection with Figures 1-5, the plug 30 is first removed to bleed or gradually release the fluid pressure from within the coupling C and the adjustable choke A, and thereafter the bolt 26 is removed so that the nut member 18 can be moved relative to the body section 211 until such nut member 18 is in position for moving the lugs 20 thereof between the lugs 21 of the body section 211 for axially or longitudinally displacing the nut 18 from the body setion 211. As soon as the nut 18 has thus been released from the body section 211, it will be evident that the body section 210 and the parts mounted therewith can then readily be disconnected from the body section 211 so as to provide access to the flow bean F' and the other internal parts of the adjustable choke A.

Also, it will be evident that the lateral surface 40a of the stop member 40 is spaced from the safety bleeder plug 30 so that after the bolt 26 has been removed and prior to the removal of the plug 30, the limited relative movement of the nut member 18 with respect to the body section 211 can be effected so as to permit leakage past the seal ring 12, as explained above, to give the operator a warning by the hissing or other noise from the escaping fluid.

Referring to Figures 7 through 10, the letter A designates generally the coupling of this invention which is adapted to connect together the sections of pipe P (Figure 7). The coupling A is fluid-tight so that fluid may pass therethrough from one pipe P to the other pipe P, and, as will be explained, the coupling A is so constructed that it is releasably connected for rapid assembly and disassembly.

The coupling A includes a plain hub 310 which is connected with one section of pipe P by annular weld 310a or any other suitable type of connection. The plain hub 310 is substantially cylindrical and has an external annular flange 311. The other section of pipe P is connected to a lug hub 312 at annular weld 312a or by any other suitable connection. The lug hub 312 has a plurality of circumferentially spaced lugs 314. A seal ring 315 is disposed between the adjacent ends of the hubs 310 and 312 and fits into the annular openings 310b and 312B of the hubs 310 and 312, respectively, to form a fluid-tight seal between the hubs 310 and 312, whereby fluid may flow through the coupling A from one of the pipes P to the other pipe P when the coupling A is in the assembled position (Figure 7). The seal ring 315 is formed of metal, although it will be appreciated that the material thereof may be varied so long as it is capable of forming a fluid-tight seal between the hubs 310 and 312.

A nut member 315 surrounds the coupling hubs 310 and 312 and maintains same in an assembled position. The hub 315 is substantially cylindrical, with radially extending projections 315a being provided to facilitate handling and turning of the nut member 315. The nut member 315 is not threaded, but the bore thereof has an inwardly extending flange 316 which has an inclined face or surface 316a extending around the entire annular area thereof, and such face 316a is adapted to contact a similarly inclined or sloped surface 311a of the annular flange 311 on the plain hub 310. The nut member 315 also has a plurality of circumferentially spaced and inwardly extending lugs 317. The spaces between the lugs 317 are such that the lugs 314 on the lug hub 312 are adapted to pass between the lugs 317 so that upon a turning of the nut member 315 relative to the hub 312, there is a co-action between the inclined shelves or wedge surfaces 314a and 317a on the lugs 314 and 317, respectively. The nut member 315 can, of course, be initially positioned and turned to some extent by hand, but as the lug hub 312 is moved toward the plain hub 310, the seal ring 315 becomes relatively tightly wedged in the annular grooves 310b and 312b so that it becomes increasingly more difficult to turn the nut member 315 relative to the hubs 310 and 312.

For tightening the nut member 315 after it has been hand-tightened, an axially-aligned bolt 320 having a wedge head 322 formed integrally or otherwise secured therewith is utilized. The threaded end 320a of the bolt 320 extends through an opening 323 in the nut member 315 and an internally threaded nut 325 is in threaded engagement with the bolt 320 when the bolt 320 is in the assembled posiiton. The wedge member 322 has a substantially arcuate shape (Figure 8) so that it conforms to the internal shape of the nut member 315. One side of the wedge member 322 is substantially axially disposed, as indicated at 322a, while the other side thereof is tapered or inclined at an angle to the longitudinal axis of the coupling A and such inclined side or edge is identified by the numeral 322b. The substantially axially disposed side 322a is adapted to contact the substantially straight side 317b of the lugs 317 (Figure 10). The inclined side 322b is adapted to contact an inclined side 314b on one of the lugs 314 (Figures 8 and 10). As the nut 325 is tightened on the bolt 320, the wedge member 322 is pulled or moved axially towards the nut 325, and during such axial movement of the bolt 320 and the wedge member 322 relative to the nut member 315, a rotative force is applied to the lug 317 which is contacted by the wedge member 322 so as to effect a turning of the nut member 315. It is thus evident that the movement of the wedge member 322 and the bolt 320 to the left (Figures 7 and 10) effects a spreading action between the lug 314 and the lug 317 which are contacted by the wedge member 322. Since the pipe P with which the hub 312, having the lugs 314 thereon, is maintained relatively fixed, the spreading force of the wedge member 322 effects the movement of the nut member 315 relative to the coupling 312. However, it will be evident that if the nut member 315 is held and the pipe P is free to rotate or turn, then the spreading action will result in the movement of the lug 314 contacted by the wedge member 322, and the hub 312 rather than the nut member 315.

A safety bleeder plug 330 is threaded or otherwise secured in an opening 332 in the lug hub 312. The plug 330 has a bleeder passage 333 therethrough which is adapted to slowly release the fluid under pressure in the coupling A before the disassembly of same. Ordinarily, the nut 330 is in the position shown in Figures 7 and 8 and closes the opening 332 so that no fluid escapes. However, when it is desired to release any fluid pressure present in the coupling A, the bleeder plug 330 is threaded or otherwise turned to establish fluid communication between the bore or interior of the coupling A and the exterior thereof through the bleeder passage 333. Due to the restricted size of the passage 333, the pressure is gradually released and ultimately the plug 330 is removed so that the entire pressure in the interior of the coupling A is released. With the plug 330 thus out of position and the pressure within the coupling A released, the wedge member 322 and bolt 320 can be removed from the nut member 315. However, prior to the removal of the plug 330, the wedge member 322 cannot be removed due to the positioning of the plug 330 in alignment with the wedge member 322. Therefore, the plug 330 serves to prevent the premature disassembly of the coupling A prior to the release of the pressure within the coupling.

The wedge member 322 and bolt 320 along with the nut 325 can be utilized for the disassembly or release of the coupling A by removing same from the opening 323 in the nut member 315 and thereafter positioning the bolt 320 in opening 335 (Figures 8–10) in the nut member 315 so that the bolt 320, nut member 322 and nut 325 assume the dotted-line position illustrated in Figure 10. In such released position, the substantially axial side 322a of the wedge member 322 contacts the substantially axial side 314c of the lug 314 and the inclined or tapered side 322b of the wedge member 322 contacts a similarly inclined end 317c of one of the lugs 317. Thus, as the wedge member 322 is moved axially toward the bolt 325 and relative to the nut member 315, the lugs 314 and 317 are spread or moved away from each other. Assuming that the hub 312 and the lugs 314 still remain fixed, the spreading or wedging action of the wedge member 322 will, therefore, turn the nut member 315 in an opposite direction to that required for the tightening of such coupling A.

In the operation or use of the coupling A of this invention, the nut member 315 is initially positioned around the pipe section P to which the plain hub 310 is to be connected. Then, the plain hub 310 is connected to that section of pipe P and the lug hub 312 is connected to the other section of pipe P. The seal ring 315 is positioned between the hubs 310 and 312 in the annular grooves 310b and 312b and then the annular nut member 315 is moved longitudinally or axially with the circumferential spaces between the lugs 317 thereof aligned with the lugs 314 so that the nut member 315 is moved to the right (Figure 7) until the lugs 317 are disposed to the right of the lugs 314. Then the nut member 315 is turned by hand to cause a sliding wedge action between the inclined surfaces 314a and 317a of the lugs 314 and 317. As previously explained, the wedging action of the surfaces 314a and 317a effects a tightening of the coupling A by moving the hubs 310 and 312 toward each other to firmly seat the seal ring 315 to thereby provide a fluid-tight seal between the hubs 310 and 312.

The bleeder plug 330 is, of course, not in position during such hand tightening. Prior to the positioning of the plug 330 in the opening 332, the bolt 320 with the wedge member 322 thereon is positioned in the nut member 315 with the bolt 320 in the opening 323. The nut 325 is thereafter positioned on the threads 320a of the bolt 320 and turned for a movement of the wedge member 322 axially toward the nut or to the left (Figure 7). As previously explained, such tightening of the nut 325 results in the application of a spreading force on the lugs 314 and 317 which are contacted by the wedge member 322 (Figures 8 and 10) so that the nut member 315 is further turned relative to the hubs 310 and 312 and a further wedging action by the sliding movement of the surfaces 314a and 317a is obtained to assure a uniform tightening of the hubs 310 and 312 with respect to the seal ring 315. It should be noted that during such tightening, the force on the bolt 320 is in line with the axis thereof and, therefore, there is no tendency to bend or twist the bolt 320. The tightening, therefore, is uniform and a uniform load is applied to the seal ring 315. Also, the large mechanical advantage gained by the wedging surfaces of the wedge member 322 permits the use of a relatively small bolt 320 for the tightening required.

After the bolt 320 and the wedge member 322 have been positioned in the opening 323 with the nut 325 threaded thereto, the safety bleeder plug 330 is threaded into the opening 332 and forms a seal to prevent fluid escape from the coupling A. Then, the coupling is ready for use. These couplings are particularly adapted for high fluid pressure use, and it will be evident that the bolt 320 with the wedge member 322 cannot be removed with the plug 330 threaded in the opening 332.

When it is desired to disassemble the coupling A, then the bleeder plug 330 must be removed. Thus, the plug 330 serves as a safety factor in that the fluid pressure in the coupling A is relieved prior to the disassembly of the coupling. As the bleeder plug 330 is threaded out of the opening 332, the bleeder passage 333 is first partially exposed and then completely exposed so that there is a gradual release of the fluid pressure within the coupling A and finally the pressure within the coupling A is equalized with the atmospheric pressure when the plug 330 is completely removed.

With the safety plug 330 out of the opening 332, the wedge member 322 and bolt 320 can be removed from the nut member 315 for the purpose of turning the nut member 315 in the opposite direction to that required for the tightening in order that the nut member 315 can be released. For such releasing operation, the bolt 20 is positioned in the opening 335 (dotted-line position of Figure 10) and the wedge member 322 is moved toward the nut again to effect an opposite movement to the nut member 315 to that previously utilized for the tightening operation. Once the initial releasing movement of the nut member 315 is obtained with the wedge member 322, then the bolt 320 and the wedge member 322 are removed so that the nut member 315 can then be turned for complete disassembly from the hubs 310 and 312.

From the foregoing, it is believed evident that the safety device S of this invention with the coupling C is adapted for use with various types of equipment. Also, it is believed evident that the safety device S can be used with various types of couplings. For example, besides the specific equipment mentioned above, it should also be pointed out that the safety device S can be used with couplings such as on Christmas tree caps, T's, crosses, and also scraper trap closures.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A coupling comprising, a lug hub having spaced external segmental lugs thereon, a plain hub adapted to be positioned adjacent said lug hub, a seal ring between said lug hub and said plain hub, a nut member having spaced internal segmental lugs thereon, the lugs on said nut member and on said lug hub having inclined surfaces engageable with each other for obtaining a relative movement therebetween upon a relative rotational movement therebetween, coacting shoulders on said nut member and said plain hub engageable with each other when said inclined surfaces of the lugs on said lug hub and said nut member are in engagement whereby upon a turning of the nut member relative to said lug hub, the lug hub and the plain hub are urged toward each other to compress the seal ring between the plain hub and the lug hub to thereby prevent fluid from escaping from the interiors of said hubs, one of said hubs having an opening through the wall thereof, a safety bleeder plug releasably mounted in said opening, said plug having a bleeder passage therethrough for establishing fluid communication between the interior and the exterior of said one of said hubs for gradually releasing the fluid pressure within said hubs, means for normally sealing said bleeder passage closed to prevent the escape of the fluid pressure within said hubs, and a stop means on said nut member adapted to engage said plug to prevent sufficient relative turning of said nut member and said lug hub for the releasing of the nut member from said lug hub.

2. The structure set forth in claim 1 wherein, said stop means is normally positioned out of engagement with said bleeder plug a sufficient distance to enable a limited relative turning of the nut member and lug hub for releasing enough of the compression on the seal ring to permit the fluid pressure within the hubs to gradually escape around said seal ring with a signalling noise for thereby warning the operator that said bleeder plug has not been removed.

3. A coupling comprising, a lug hub having spaced external segmental lugs thereon, a plain hub adapted to be positioned adjacent said lug hub, a nut member having spaced internal segmental lugs thereon, the lugs on said nut member and on said lug hub having inclined surfaces engageable with each other for obtaining a relative movement therebetween upon a relative rotational movement therebetween, coacting shoulders on said nut member and said plain hub engageable with each other when said inclined surfaces of the lugs on said lug hub and said nut member are in engagement whereby upon a turning of the nut member relative to said lug hub, the lug hub and the plain hub are urged toward each other to seal therebetween and thereby prevent fluid from escaping from the interiors of said hubs, one of said hubs having an opening through the wall thereof, safety means including a bleeder plug releasably mounted in said opening for gradually releasing the fluid pressure within said hubs, and stop means on said nut member adapted to engage said safety means to prevent sufficient relative turning of said nut member and said lug hub for the releasing of the nut member from said lug hub until the safety means is removed.

4. In a coupling of the type employing segmental lugs having complementary engageable sticking taper wedge surfaces thereon for making up the coupling upon relative rotation of the lug carrying parts, the improvement which comprises the combination therewith of safety means preventing relative rotation of the lug carrying parts a sufficient distance to disengage the lug wedge surfaces until pressure within the coupling has been bled off, said safety means including a bleeder plug carried by the coupling which when removed to permit disassembly of the coupling bleeds down pressure within the coupling, said bleeder plug having a threaded portion secured in a hole through the wall of one of the coupling parts, a wrench part spaced from its threaded portion, and a weakened section intermediate the threaded portion and wrench part which will permit the plug to shear at the weakened portion upon the application of excessive torque to the wrench part.

5. A coupling comprising, a lug hub having spaced external segmental lugs thereon, a plain hub adapted to be positioned adjacent said lug hub, a nut member having spaced internal segmental lugs thereon, the lugs on said nut member and on said lug hub having inclined surfaces engageable with each other for obtaining a relative movement therebetween upon a relative rotational movement therebetween, coacting shoulders on said nut member and said plain hub engageable with each other when said inclined surfaces of the lugs on said lug hub and said nut member are in engagement whereby upon a turning of the nut member relative to said lug hub, the lug hub and the plain hub are urged toward each other to seal therebetween and thereby prevent fluid from escaping from the interiors of said hubs, one of said hubs having an opening through the wall thereof, safety means including a bleeder plug having a wrench part and a threaded portion which is threaded into said opening for gradually releasing the fluid pressure within said hubs, a weakened section intermediate the threaded portion and wrench part which will permit the plug to shear at the weakened portion upon the application of excessive torque to the wrench part, and stop means on said nut member adapted to engage said safety means to prevent sufficient relative turning of said member and said lug hub for the releasing of the nut member from said lug hub until the safety means is removed.

6. The coupling of claim 3 wherein the safety means includes a wedge member inserted between confronting lugs on the lug hub and nut and the stop means is said nut lug, said opening positioned so that the bleeder plug obstructs removal of the wedge and thereby limits rotation of the nut until the bleeder plug is removed.

7. The coupling of claim 3 wherein the safety means includes a wedge member inserted between confronting lugs on the lug hub and nut and the stop means is said nut lug, said opening positioned so that the bleeder plug obstructs removal of the wedge and thereby limits rotation of the nut until the bleeder plug is removed, said wedge additionally providing means for tightening the coupling.

8. The coupling of claim 3 wherein the safety means includes a wedge member inserted between confronting lugs on the lug hub and nut and the stop means is said nut lug, said opening positioned so that the bleeder plug obstructs removal of the wedge and thereby limits rotation of the nut until the bleeder plug is removed, said wedge additionally providing means for tightening the coupling and insertable between other confronting hub and nut lugs to loosen the nut.

9. A coupling adapted to connect sections of pipe together comprising, hub means connected to the pipe sections to be connected together, a nut member having means thereon for engaging said hub means for effecting a connection of the hub means upon a turning of said nut member with respect to said hub means, wedge means axially movable relative to said nut member for turning said nut member with respect to said hub means whereby a connection of the hub means and the pipe sections is effected, a threaded hole in the hub means, and a bleeder plug in said hole normally sealing said hole and blocking movement of the wedge means in a direction to permit release of the coupling, whereby said plug must be removed prior to the release of the coupling.

10. A coupling comprising, first and second members adapted to be coupled together, said first member carrying spaced internal segmental lugs thereon, said second member carrying spaced external lugs thereon, said lugs when rotated relative to each other to a first position permitting separation of said members and when rotated to a second position preventing separation of said members, said lugs having coacting inclined surfaces whereby when rotated to said second position the members are urged toward each other to seal therebetween to prevent fluid from escaping from the interior of said members, said second member having an opening through the wall thereof, safety means including a bleeder plug releasably mounted in said opening for gradually releasing the fluid pressure within said members, and stop means on said first member adapted to engage said safety means to prevent sufficient relative turning of said first and second members for the releasing of said second member from said first member until the safety means is removed.

11. A coupling comprising, first and second members adapted to be coupled together in pressure tight relationship, means sealing between the members when they are coupled together, coacting lug parts carried by each member which when rotated to a released position permit separation of said members and when rotated to an engaged position prevent separation of said members, and safety means preventing relative rotation and release of said members until the interior of the coupling has been vented to atmosphere including a threaded aperture extending completely through the wall of said first member, a bleed plug releasably secured in said aperture in pressure tight relationship therewith, means on said plug projecting externally beyond the outer surface of said one member, and a lug carried by the second member and engaging the plug when the members are rotated toward released position to thereby prevent release of the coupling members until the plug has been removed.

12. The coupling of claim 3 wherein the safety means includes a bar member inserted between confronting lugs on the lug hub and nut and the stop means is said nut lug, said bleeder plug releasably maintaining the bar between the confronting lugs to thereby limit rotation of the nut relative to the lug hub.

References Cited in the file of this patent

UNITED STATES PATENTS

| | | |
|---|---|---|
| 228,209 | Meier | June 1, 1880 |
| 266,359 | Gotzel | Oct. 24, 1882 |
| 350,844 | Rollins | Oct. 12, 1886 |
| 896,503 | Bouchard | Aug. 11, 1908 |
| 1,233,172 | Berry | July 10, 1917 |
| 1,510,000 | Gold | Sept. 30, 1924 |
| 1,583,396 | De Muth | May 4, 1926 |
| 1,663,755 | Gammeter | Mar. 27, 1928 |
| 1,859,251 | Brown | May 17, 1932 |
| 1,890,011 | Wirz | Dec. 6, 1932 |
| 2,025,112 | Laurent | Dec. 24, 1935 |
| 2,165,163 | Waters | July 4, 1939 |
| 2,208,353 | Wooley | July 16, 1940 |
| 2,245,847 | Bagby | June 17, 1941 |
| 2,511,308 | Tropper | June 13, 1950 |
| 2,614,724 | Wyman | Oct. 21, 1952 |
| 2,689,754 | Dunton | Sept. 21, 1954 |
| 2,726,104 | Boitnott | Dec. 6, 1955 |
| 2,740,974 | Lewis | Apr. 10, 1956 |
| 2,744,771 | Laurent | May 8, 1956 |
| 2,753,197 | Loeffler | July 3, 1956 |
| 2,869,752 | Hall | Jan. 20, 1959 |

FOREIGN PATENTS

| | | |
|---|---|---|
| 302,787 | Great Britain | Dec. 27, 1928 |
| 874,691 | France | May 18, 1942 |
| 565,307 | Great Britain | Nov. 6, 1944 |
| 828,335 | Germany | Jan. 17, 1952 |